(12) United States Patent　(10) Patent No.:　US 8,839,645 B2
Inoue et al.　(45) Date of Patent:　Sep. 23, 2014

(54) METHOD OF MANUFACTURING OPTICAL FIBER BASE MATERIAL AND APPARATUS OF THE SAME

(71) Applicant: Shin-Etsu Chemical Co., Ltd., Tokyo (JP)

(72) Inventors: Dai Inoue, Ibaraki (JP); Hiroyuki Koide, Gunma (JP); Takaaki Nagao, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/947,923

(22) Filed: Jul. 22, 2013

(65) Prior Publication Data

US 2013/0298611 A1　Nov. 14, 2013

Related U.S. Application Data

(62) Division of application No. 12/341,324, filed on Dec. 22, 2008, now abandoned.

(30) Foreign Application Priority Data

Jun. 26, 2006　(JP) ................................. 2006-175712
Jun. 21, 2007　(JP) ................................. 2007-164422
Jun. 26, 2007　(WO) ................. PCT/JP2007/062808

(51) Int. Cl.
*C03B 37/014*　(2006.01)

(52) U.S. Cl.
CPC .................................. *C03B 37/0146* (2013.01)
USPC ................................. 65/426; 65/427; 65/422

(58) Field of Classification Search
USPC .................... 65/379, 424, 426, 427, 489, 507
See application file for complete search history.

(56) References Cited

U.S. PATENT DOCUMENTS 3,957,476 A * 5/1976 Rau .............................. 65/30.13
5,749,723 A 　5/1998 Okase
5,766,291 A 　6/1998 Sato et al.

(Continued)

FOREIGN PATENT DOCUMENTS

CN　1461736　12/2003
EP　1367028 A2　12/2003

(Continued)

OTHER PUBLICATIONS

English Translation of JP2003-165736, performed by FLS, Inc. Feb. 2013.*

(Continued)

*Primary Examiner* — Matthew Daniels
*Assistant Examiner* — Lisa Herring
(74) *Attorney, Agent, or Firm* — Peter J. Meza; Hogan Lovells US LLP

(57) ABSTRACT

A method of manufacturing an optical fiber base material includes: forming a porous glass base material by depositing glass particles; providing a synthetic quartz glass vessel at least partly made of quartz glass which contains aluminum equal to or less than 0.01 ppm; introducing dehydration reaction gas and inert gas into the vessel; heating a portion made of quartz glass which contains aluminum equal to or less than 0.01 ppm in the vessel that contains the dehydration reaction gas and the inert gas; and inserting the porous glass base material into the heated vessel to dehydrate and sinter the porous glass base material.

10 Claims, 4 Drawing Sheets

(56) References Cited

U.S. PATENT DOCUMENTS

| | | | |
|---|---|---|---|
| 6,543,257 | B1 | 4/2003 | Koaizawa et al. |
| 2003/0221461 | A1 | 12/2003 | Oyamada et al. |
| 2006/0038695 | A1 | 2/2006 | Isaacs |

FOREIGN PATENT DOCUMENTS

| | | |
|---|---|---|
| JP | 59184736 | 10/1984 |
| JP | 64018932 | 1/1989 |
| JP | 02018333 | 1/1990 |
| JP | 2001139333 | 5/2001 |
| JP | 2002249342 | 9/2002 |
| JP | 2003137584 A | 5/2003 |
| JP | 2003165736 | 6/2003 |
| JP | 2003212559 | 7/2003 |
| JP | 2004002109 | 1/2004 |
| JP | 2004231482 | 8/2004 |
| JP | 2006124220 | 5/2006 |
| JP | 2006131463 A | 5/2006 |

OTHER PUBLICATIONS

EP Extended Search Report, application No. 07767614.6-1218 / 2048120 PCT/JP2007062808, dated Jan. 30, 2013, pp. 5.

JP Office Action with English Translation, application No. 2007-164422, dated Aug. 16, 2012, pp. 6.

Chinese 2nd Office Action with English Translation, application No. 200780024241.8, dated Sep. 27, 2011, pp. 14.

Resubmission of Machine Translation of Koichi et at., JP2003-165736, pp. 11, Sep. 2011.

Office Action for Japanese Patent Application No. 2007-164422 with English translation; dated Jun. 10, 2014; pp. 1-3.

"New Glass graduate basic process text 2000" with English translation; 3 pages.

European Search Report regarding Application No. 07767 614.6-1355; Reference No. 097EP 0138 BE; dated Jun. 20, 2014; 6 pages.

* cited by examiner

METHOD OF MANUFACTURING OPTICAL FIBER BASE MATERIAL AND APPARATUS OF THE SAME

CROSS REFERENCE TO RELATED APPLICATIONS

The present application is a divisional of U.S. patent application Ser. No. 12/341,324 filed Dec. 22, 2008 which is a continuation in-part of PCT/JP2007/062808 filed Jun. 26, 2007, which claims priority from Japanese Patent Application No. 2006-175712 filed Jun. 26, 2006, and Japanese Patent Application No. 2007-164422 filed Jun. 21, 2007, the contents of which are incorporated herein in their entireties by this reference.

BACKGROUND

1. Technical Field

The present invention relates to a method of manufacturing an optical fiber base material being capable of constantly manufacturing an optical fiber base material of high quality by so-called VAD, and an apparatus of the same.

2. Related Art

VAD is well-known as a method of manufacturing base materials for optical fibers. This method employs the following apparatus, for example.

In this apparatus, glass particles produced with a core deposition burner and a cladding deposition burner disposed in a reaction chamber; and the glass particles are deposited onto a tip of a starter mounted on a shaft which rotatably lifts up, so that a porous glass base material for optical fiber composed of a core layer and a cladding layer is manufactured. The core layer may be $SiO_2$ with which $GeO_2$ is doped, and the cladding layer may be substantially pure $SiO_2$.

The porous glass base material 1 manufactured as described above is dehydrated and sintered in a heating furnace. The heating furnace has a furnace tube 2 which can be sealed, an electric furnace 3 which heats a part of or the whole of the furnace tube 2, a gas introducing port 4 which introduces any gas into the furnace tube and a gas discharging port 5 which discharges the exhaust gas as shown in FIG. 1, for example. FIGS. 1A to 1C progressively show vitrifying the porous glass base material. Here, reference numeral 6 indicates a shaft which supports the porous glass base material 1.

Dehydrating is performed by heating the base material at approximately 1,100 degrees Celsius in dehydrating gas composed of such as chlorine, oxygen and helium. Meanwhile, vitrifying is performed by heating the base material at approximately 1,500 degrees Celsius in an atmosphere containing such as helium.

For the furnace tube forming a part of the heating furnace, conventionally a silica tube made of natural quartz has been employed as described in Japanese Patent Application Publication No. 2004-002109. For example, the silica tube may be an electric-furnace-melted natural quartz glass tube such as HERALUX-E (trade name), available from Shin-Etsu Quartz Products Co., Ltd., which is made by pulverizing natural quartz and melting in an electric furnace (herein after referred to as a natural quartz tube).

The optical fiber base material manufactured as above may be formed as a complete optical fiber base material by adding a cladding to the periphery thereof.

An optical fiber is obtained by drawing the optical fiber base material manufactured as above, and is provided for optical signal transmission. For example, light having a wavelength of 1,310 nm and 1,550 nm is modulated and transmitted through a single-mode fiber.

Usually, the transmission loss of the optical fiber at the wavelength of 1,310 nm is about 0.32 to 0.34 dB/km, however, it could infrequently become higher than usual, such as about 0.34 to 0.36 dB/km. In most cases, the transmission loss of the optical fiber at the wavelength of 1,550 nm is not very higher than a normal value. Moreover, when transmission losses for a wide wavelength range, such as 900 nm to 1,600 nm are examined, the shorter the wavelength is, the larger the transmission loss is. Conventionally, such transmission loss has been acceptable, however, the market strictly requests for an optical characteristic in recent years, therefore, such transmission loss has come under a problem.

SUMMARY

According to an aspect related to the innovations herein, a method of manufacturing an optical fiber base material being capable of reducing an occurrence of the situation described above that the transmission loss for a short wavelength region, particularly equal to or less than 1,310 nm, is larger, and an apparatus of the same are provided. This object can be achieved by combinations of features recited in dependent claims. In addition, independent claims define further advantageous specific examples.

According to an aspect related to the innovations herein, the method of manufacturing an optical fiber base material is provided. The method includes: forming a porous glass base material by depositing glass particles; providing a vessel at least partly made of quartz glass which contains aluminum equal to or less than 0.01 ppm; introducing dehydration reaction gas and inert gas into the vessel; heating a portion made of quartz glass which contains aluminum equal to or less than 0.01 ppm in the vessel containing the dehydration reaction gas and the inert gas; and inserting the porous glass base material into the heated vessel to dehydrate and sinter the porous glass base material.

According to an aspect related to the innovations herein, an apparatus for manufacturing an optical fiber base material that dehydrates and sinters a porous glass base material for an optical fiber is provided. The apparatus includes: a heat source; a furnace tube at least partly made of quartz glass which contains aluminum equal to or less than 0.01 ppm; a gas introducing port that introduces gas to the furnace tube; and a gas discharging port that discharges gas from the furnace tube.

The summary clause does not necessarily describe all necessary features of the embodiments of the present invention. The present invention may also be a sub-combination of the features described above.

DESCRIPTION OF EXEMPLARY EMBODIMENTS

Figure 1A:
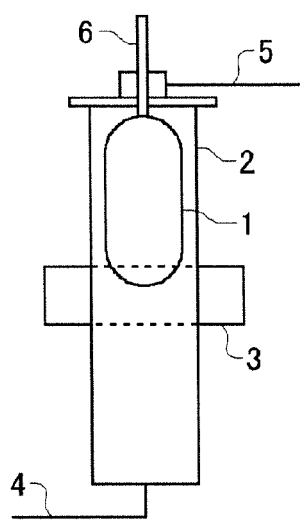
FIGS. 1A to 1C are schematic views progressively explaining a step of vitrifying a porous glass base material.
Figure 1B:
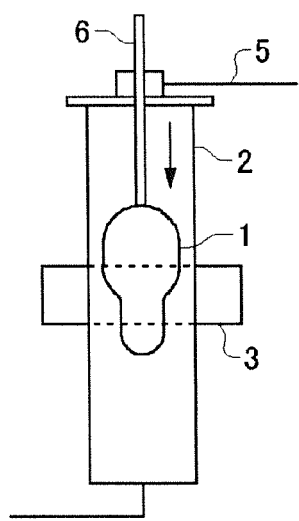
Figure 1C:
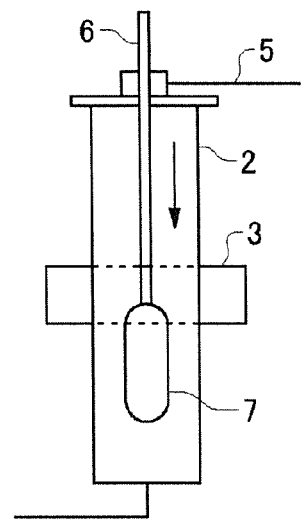

Some aspects of the invention will now be described based on the embodiments, which do not intend to limit the scope of the present invention, but exemplify the invention. All of the features and the combinations thereof described in the embodiment are not necessarily essential to the invention.

The conventional furnace tube employs a glass tube made of natural quartz that is manufactured by melting powdered natural quartz in an electric furnace (hereinafter referred to as a natural quartz furnace tube). It has been considered that increase of the transmission loss is caused by contaminating the optical fiber base material with impurities such a very small amount of ferrum and aluminum which are contained in the natural quartz. In addition, it has been considered that increase of the transmission loss is caused by contaminating the optical fiber base material in the furnace tube with a metal forming a furnace or a metal contained in carbon which diffuses and transmits through the tube wall due to corrosion.

More specifically, it is considered that increase of the transmission loss is caused by the following mechanism. That is, the natural quartz furnace tube is progressively crystallized (into cristobalite) while it is used at a high temperature such as approximately 1,400 degrees Celsius. The crystallization starts with impurities and crystallite as a core, which are contained in the natural quartz. After several hundred hours, most of the heated region is crystallized. Particularly, the electric-furnace-melted natural quartz contains aluminum equal to or more than 15 ppm, and the aluminum acts as the core of crystallization. It is considered that a small amount of impurities such as ferrum contained in the natural quartz separate out and diffuse in a crystal grain boundary during the crystallization. The diffusion rate of the impurities in the crystal grain boundary is very faster than a rate at which the impurities diffuse in amorphous glass.

Therefore, in comparison with a state before crystallization, impurities such as ferrum are easily discharged from the crystallized natural quartz furnace tube into the interior thereof. A part of the impurities which were discharged into the furnace tube is taken into the optical fiber base material and causes fluctuation of the density of glass, so that Rayleigh scattering increases. It is known that optical loss due to Rayleigh scattering is in proportion to $1/\lambda^4$, where $\lambda$ indicates a wavelength of light. Thus, the phenomenon that the shorter the wavelength is, the larger the loss is, can be explained by the above described mechanism.

Therefore, a furnace tube is produced by so-called CVD method, that is, using vitrified synthetic quartz, which is obtained by hydrolyzing silicide such as $SiCl_4$, $(CH_3)SiCl_3$, $(CH_3)_2SiCl_2$ with oxyhydrogen flame to form a soot deposit, and melting the soot deposit in a heating furnace.

When ferrum and aluminum are taken as an example, the concentration of the impurities contained in the synthetic quartz tube which is produced by using such high-purity material is equal to or less than 0.01 ppm. Meanwhile, it is difficult for the conventional natural quartz to completely eliminate impurities in the material, and the natural quartz contains ferrum of approximately 0.1 ppm and aluminum of approximately 15 ppm as impurities. An example of analysis of metal impurities contained in the raw material is shown in Table 1 below. Table1:

The synthetic quartz that is made of a high-purity silicide as the raw material and made by depositing the high-purity silicide contains little impurity and crystallite. For example, the synthetic quartz contains aluminum equal to or less than 0.001 ppm as the core of crystallization. Accordingly, even if the synthetic quart is used under a high temperature, the crystallization very slowly progresses in comparison with the natural quartz. Consequently, the synthetic quartz contains little impurity, and a path through which impurities diffuse is not formed therein over the long term. Therefore, when the synthetic quartz having such feature is used as a furnace tube, it is considered that discharge of impurities into the furnace tube scarcely occur. Thus, an optical fiber base material which is manufactured by using the furnace tube of synthetic quartz according to the mechanism described above can significantly reduce a risk of increasing the transmission loss in comparison with the conventional one.

Under a use environment intended for the present invention, crystallization of the synthetic quartz progresses by about 1 mm for 1,500 hours. Therefore, in a period obtained by multiplying the thickness of the synthetic quartz by 1,500 hours, a state in which the glass layer remains is maintained even if the synthetic quartz are used at a temperature equal to or more than 1,400 degrees Celsius, so that a risk of contaminating the optical fiber base material can be reduced.

In addition, since the synthetic quartz is not easily crystallized in comparison with the natural quartz, the viscosity thereof decreases by heating. It is likely that a portion in which the viscosity reduces is deformed due to a difference in pressure between the inside and outside of the furnace tube. When the deformed furnace tube contacts an optical fiber base material during manufacture, the optical fiber base material damages. Therefore, it is preferable to monitor the pressure in the furnace tube and control so as not to result in excess differences between the inside and outside of the furnace tube.

For example, it is preferable that an apparatus for manufacturing an optical fiber base material includes a pressure control mechanism 7 that controls a pressure in the furnace tube such that the difference in pressure is within a tolerance when the pressure of the inside or outside of the furnace tube is out of a predetermined tolerance. Specifically, the apparatus for manufacturing an optical fiber base material may include an intra-furnace tube pressure measuring unit 11 that measures a pressure in the furnace tube, and an extra-furnace tube pressure measuring unit 12 that measures a pressure adjacent to the heat source 3 outside the furnace tube. In addition, in order to artificially adjust a pressure in the furnace tube, an alarm device 8 may activate when the difference in pressure of the inside or outside of the furnace tube is out of a predetermined tolerance. Moreover, the exhaust port may be provided with an automatic valve 9 to automatically adjust a flow rate of the valve in order that the difference in pressure of the inside or outside of the furnace tube be within a predetermined tolerance.

The tolerance of the pressure in the furnace tube may be such as 0 Pa to 1300 Pa. In addition, since a portion adjacent to the furnace would be the highest temperature in the furnace tube and tend to be deformed, it is preferable to employ a pressure in the furnace as a pressure of the extra-furnace tube in order to know the difference in pressure between the inside and outside of the furnace tube. The tolerance of the difference in pressure between the inside and outside of the furnace tube may be such as −200 Pa to 450 Pa.

Figure 4:
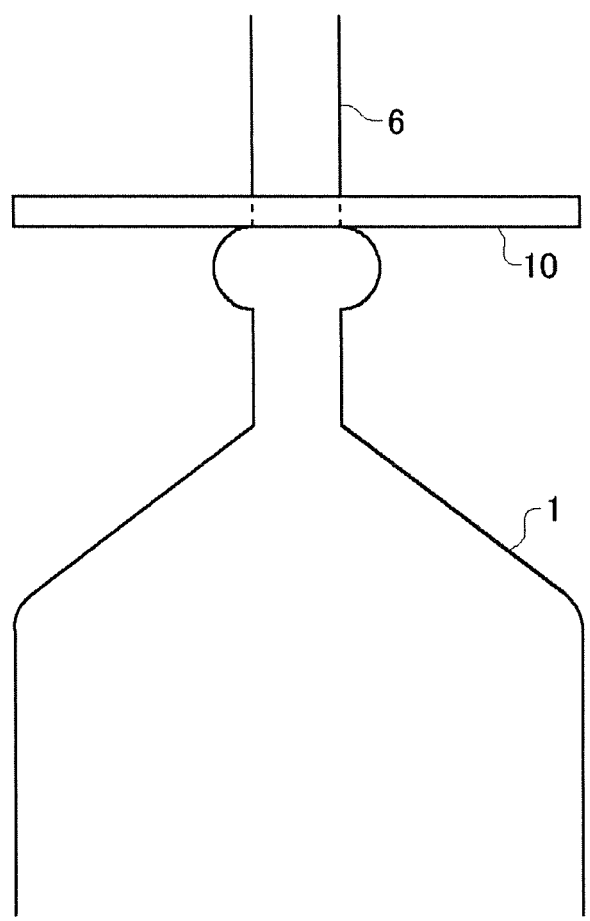
FIG. 4 shows an exemplary convection preventing plate 10 that is mounted to a shaft 6 for supporting a glass base material.

Moreover, it is considered that the pressure in the furnace tube is fluctuated because of convecting gas in the furnace tube. The diameter of a porous glass base material is reduced by dehydrating and sintering. Therefore, a gap between the base material and the inner wall of the furnace tube is extended so that it facilitates to convect the gas in the furnace tube. As shown in FIG. 4, the convection preventing plate 10 may be provided for preventing the gas from convecting after the diameter of the base material reduces. It is preferable that the convection preventing plate 10 is provided adjacent to a portion of the shaft 6 on which the porous glass base material is mounted. The diameter of the convection preventing plate 10 may be approximately equal to the diameter of the porous glass base material before being reduced by dehydrating and sintering. It is preferable that the convection preventing plate is made of quartz.

Here, at least a portion of the furnace tube must be made of the synthetic quartz. Specifically, the portion which is heated at a high temperature by a heat source such as an electric furnace must be made of the synthetic quartz. Even if the other portion is made of the natural quartz, the effect of the invention is not hurt.

In addition, it is not directly related to the object of the present invention, however, the synthetic quartz used in the embodiment contains little hydroxy group equal to or less than 1 ppm. Therefore, in view of the description of Patent document 1 that moisture contained in the furnace tube adversely affects the loss characteristic of the optical fiber around the wavelength of 1,380 nm, the synthetic quartz of the embodiment can be used for manufacturing the optical fiber containing little hydroxy group of which demand has rapidly grown in recent years without any problem although the furnace tube is manufactured by a method different from that of the above described Japanese Patent Application Publication No. 2004-002109. The step of eliminating adsorption moisture described as the above described Japanese Patent Application Publication No. 2004-002109. is applicable to the synthetic quartz furnace tube which is used in the present invention as well.

Embodiment 1 For the sake of comparison, the porous glass base material which is deposited by VAD is separated into a first furnace tube of synthetic quartz and a second furnace tube of natural quartz, each of which thickness of the wall is 4 mm. Then, each furnace tube is dehydrated and sintered. Further, a cladding is added to each dehydrated and sintered base material, and the base material with the cladding is vitrified, so that an optical fiber base material is obtained. The obtained optical fiber base materials are drawn respectively to measure the transmission loss at the wavelength of 1,310 nm, and then, a distribution of losses are compared. The measured optical fibers are obtained by drawing the optical fiber base materials which are manufactured around the same time, of which 177 fibers are manufactured with the furnace tube of synthetic quartz and of which 1,059 fibers are manufactured with the furnace tube of natural quartz.

Figure 2:
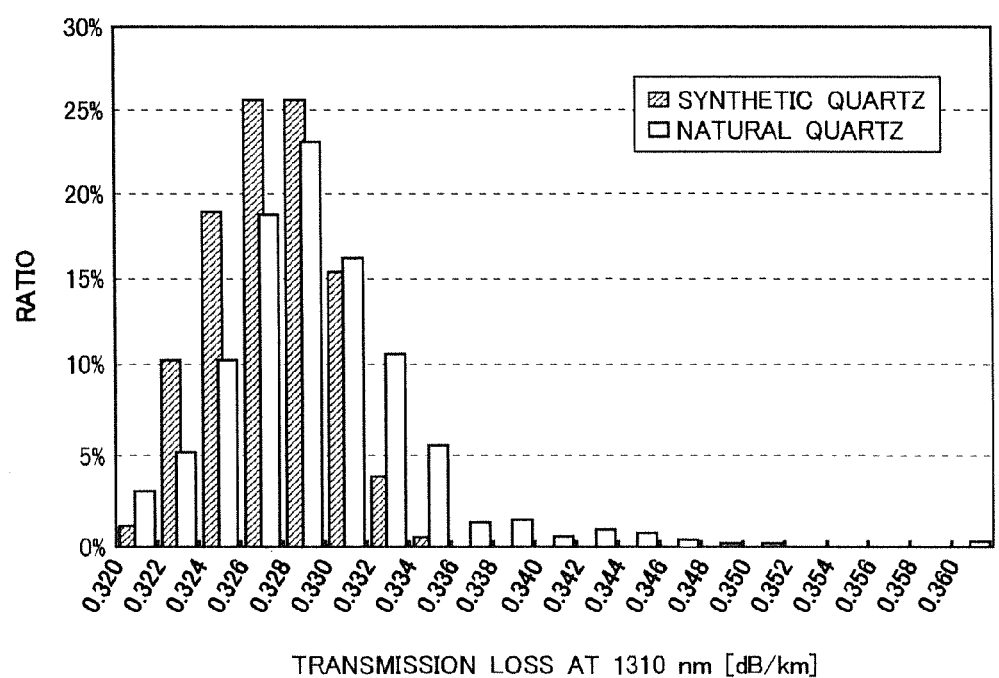
FIG. 2 shows a distribution of transmission losses for optical fibers at a wavelength of 1,310 nm, which are obtained by using a furnace tube of synthetic quartz and a furnace tube of natural quartz.
Figure 3:
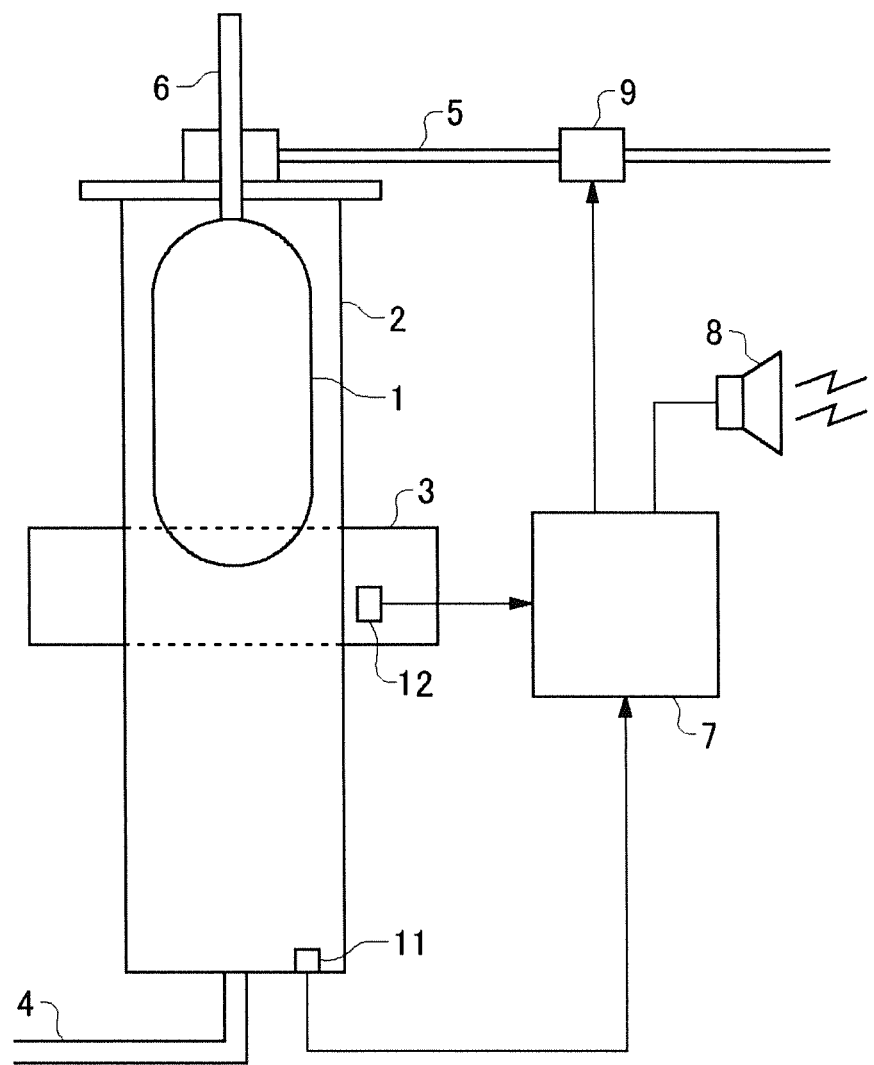
FIG. 3 shows an exemplary apparatus for manufacturing an optical fiber base material.

As shown in FIG. 2, among the optical fibers made by the furnace tube of natural quartz, 4% of those have the transmission loss more than 0.34 dB/k. Meanwhile, no optical fiber made by the furnace tube of synthetic quartz have the transmission loss more than 0.34 dB/k.

Here, the furnace tube of synthetic quartz is taken out upon exceeding 6,000 hours over which the furnace tube of synthetic quartz is subjected to a high temperature more than 1,400 degrees Celsius, and the heated portion is examined. The result is that the glass layer is totally eliminated and entirely crystallized in a large part.

The manufacturing method and the manufacturing apparatus according to the present invention may be provided in another embodiment. That is, in a manufacturing method and a manufacturing apparatus for an optical fiber base material, a vessel which accommodates a porous glass base material is made of synthetic quartz glass, which contains metal impurities less than those in the natural quartz glass. It is preferable that the content of aluminum of the synthetic quartz glass is equal to or less than one-tenth of the metal impurities of the natural quartz glass.

While the embodiments of the present invention have been described, the technical scope of the invention is not limited to the above described embodiments. It is apparent to persons skilled in the art that various alternations and improvements can be added to the above-described embodiments. It is also apparent from the scope of the claims that the embodiments added with such alternations or improvements can be included in the technical scope of the invention. The claims, specification and drawings describe the processes of an apparatus, a system, a program and a method by using the terms such as operations, procedures, steps and stages. When a reference is made to the execution order of the processes, wording such as "before" or "prior to" is not explicitly used. The processes may be performed in any order unless an output of a particular process is used by the following process. In the claims, specification and drawings, a flow of operations may be explained by using the terms such as "first" and "next" for the sake of convenience. This, however, does not necessarily indicate that the operations should be performed in the explained order.

As is apparent from the above description, since a synthetic quartz glass vessel is used as a furnace tube, impurities from a furnace tube material are not discharged into the furnace tube, so that an optical fiber base material having an excellent optical characteristic can be constantly manufactured. Moreover, by drawing the optical fiber base material, an optical fiber having a low transmission loss can be obtained.

What is claimed is:

1. A method of manufacturing an optical fiber base material, comprising:
   forming a porous glass base material by depositing glass particles;
   providing a vessel at least partly made of quartz glass which contains an aluminum concentration equal to or less than 0.01 ppm;
   introducing dehydration reaction gas and inert gas into the vessel; heating a portion made of quartz glass which contains an aluminum concentration equal to or less than 0.01 ppm in the vessel containing the dehydration reaction gas and the inert gas; and
   inserting the porous glass base material into the heated vessel to dehydrate and sinter the porous glass base material,
   wherein the aluminum impurity concentration of less than 0.01 ppm is selected so that the optical fiber base material is capable of reducing the transmission loss at a wavelength equal to and shorter than 1310 nm such that a corresponding transmission loss is less than 0.34 db/km, and
   wherein the step of providing the vessel comprises providing a vessel having a thickness such that a total amount of time over which the vessel is subjected to a temperature exceeding 1,400 degrees Celsius is within a time period over which a glass layer remains in a depthwise direction in at least a part of the portion made of quartz glass which contains an aluminum concentration equal to or less than 0.01 ppm in the vessel and the time period is calculated by multiplying a thickness (mm) of the quartz glass which contains an aluminum concentration equal to or less than 0.01 ppm in the vessel by 1,500 hours.

2. The method according to claim 1, wherein the portion made of quartz glass which contains an aluminum concentration equal to or less than 0.01 ppm in the vessel that is formed by melting a soot deposit, the soot deposit being formed by depositing glass particles which are produced by hydrolyzing silicide with oxyhydrogen flame.

3. The method according to claim 2, wherein the silicide includes any of $SiCl_4$, $(CH_3)SiCl_3$, $(CH_3)_2SiCl_2$ or a mixed compound thereof.

4. The method according to claim 1, wherein the portion made of quartz glass which contains an aluminum concentration equal to or less than 0.01 ppm is larger than at least an area heated by a heat source in the heating.

5. The method according to claim 1, wherein a pressure in the vessel is adjusted in the heating and the dehydrating and sintering.

6. The method according to claim 5, wherein the heating and the dehydrating and sintering further includes alerting when the pressure in the vessel is out of a predetermined range.

7. The method according to claim 5, wherein the heating and the dehydrating and sintering further includes measuring a pressure in the vessel and controlling an outlet flow in order that the pressure in the vessel be within a predetermined range.

8. The method according to claim 5, wherein the heating and the dehydrating and sintering further includes alerting when there is a difference in pressure between the inside of the vessel and a portion adjacent to a heat source outside the vessel.

9. The method according to claim 5, wherein the heating and the dehydrating and sintering further includes measuring a difference in pressure between the inside of the vessel and a portion adjacent to a heat source outside the vessel and controlling an outlet flow in order that the measured difference in pressure be within a predetermined range.

10. A method of manufacturing an optical fiber base material, comprising:

forming a porous glass base material by depositing glass particles;

providing a vessel at least partly made of quartz glass which contains an aluminum concentration equal to or less than 0.01 ppm;

introducing dehydration reaction gas and inert gas into the vessel; heating a portion made of quartz glass which contains an aluminum concentration equal to or less than 0.01 ppm in the vessel containing the dehydration reaction gas and the inert gas; and inserting the porous glass base material into the heated vessel to dehydrate and sinter the porous glass base material, wherein the aluminum impurity concentration of less than 0.01 ppm is selected so that the optical fiber base material is capable of reducing the transmission loss at a wavelength equal to and shorter than 1310 nm such that a corresponding transmission loss is less than 0.34 db/km, wherein the step of providing the vessel comprises providing a vessel having a thickness such that a total amount of time over which the vessel is subjected to a temperature exceeding 1,400 degrees Celsius is within a time period over which a glass layer remains in a depthwise direction in at least a part of the portion made of quartz glass which contains an aluminum concentration equal to or less than 0.01 ppm in the vessel and the time period is calculated by multiplying a thickness (mm) of the quartz glass which contains an aluminum concentration equal to or less than 0.01 ppm in the vessel by 1,500 hours, and wherein the method is performed in a furnace tube, and wherein the tolerance of the difference in pressure between the inside and outside of the furnace tube is −200 Pa to 450 Pa.

* * * * *